(12) United States Patent  
Norris et al.

(10) Patent No.: US 7,966,807 B2  
(45) Date of Patent: Jun. 28, 2011

(54) VAPOR COOLED STATIC TURBINE HARDWARE

(75) Inventors: James W. Norris, Lebanon, CT (US); James D. Hill, Tolland, CT (US); Craig A. Nordeen, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 1423 days.

(21) Appl. No.: 11/654,472

(22) Filed: Jan. 17, 2007

(65) Prior Publication Data

US 2010/0263388 A1    Oct. 21, 2010

(51) Int. Cl.
*F02K 3/02*    (2006.01)
*F02C 7/12*    (2006.01)

(52) U.S. Cl. ............... 60/226.1; 60/806; 415/114

(58) Field of Classification Search ........... 60/39.511, 60/226.1, 806; 415/114, 177, 178, 179
See application file for complete search history.

(56) References Cited

U.S. PATENT DOCUMENTS

| | | | |
|---|---|---|---|
| 2,708,564 A * | 5/1955 | Erickson ............... | 415/114 |
| 3,287,906 A * | 11/1966 | McCormack .......... | 60/39.511 |
| 3,334,685 A | 8/1967 | Burggraf et al. | |
| 3,844,679 A | 10/1974 | Grondahl et al. | |
| 5,857,836 A | 1/1999 | Stickler et al. | |
| 5,954,478 A | 9/1999 | Stickler et al. | |
| 5,975,841 A * | 11/1999 | Lindemuth et al. ........... | 415/114 |
| 6,931,834 B2 | 8/2005 | Jones | |
| 6,990,797 B2 | 1/2006 | Venkataramani et al. | |
| 7,748,211 B2 * | 7/2010 | Norris et al. ............... | 60/247 |
| 2007/0022732 A1 | 2/2007 | Holloway et al. | |

FOREIGN PATENT DOCUMENTS

WO    WO 2005/073539 A1    8/2005

OTHER PUBLICATIONS

S. Narayanan K.R., "What is a Heat Pipe?", http://www.cheresources.com/htpipes.shtml (visited Oct. 2, 2006).

* cited by examiner

*Primary Examiner* — Louis Casaregola
(74) *Attorney, Agent, or Firm* — Kinney & Lange, P.A.

(57) ABSTRACT

A cooling system for a gas turbine engine includes a non-rotating component extending into an engine flowpath, a vapor cooling assembly configured to transport thermal energy from a vaporization section to a condenser section through cyclical evaporation and condensation of a working medium sealed within the vapor cooling assembly, wherein the vaporization section is located at least partially within the non-rotating component, and wherein the condenser section is located outside the non-rotating component and away from the engine flowpath.

20 Claims, 2 Drawing Sheets

US 7,966,807 B2

VAPOR COOLED STATIC TURBINE HARDWARE

BACKGROUND OF THE INVENTION

The present invention relates to a system for cooling static structures of gas turbine engines.

Known gas turbine engines have utilized superalloys, thermal barrier coatings (TBCs), and fluidic cooling schemes in order to provide engine structures that can operate efficiently at high temperatures and pressures while still maintaining a relatively long lifespan. However, it is desired to provide improved cooling capabilities for gas turbine engines, in order to better maintain engine components at temperatures below designated maximum operating temperature levels. Moreover, it is desired to reduce energy losses by permitting thrust recovery of thermal energy transferred away from a gas flowpath by a cooling system.

BRIEF SUMMARY OF THE INVENTION

A cooling system for a gas turbine engine according to the present invention includes a non-rotating component extending into an engine flowpath, a vapor cooling assembly configured to transport thermal energy from a vaporization section to a condenser section through cyclical evaporation and condensation of a working medium sealed within the vapor cooling assembly, wherein the vaporization section is located at least partially within the non-rotating component, and wherein the condenser section is located outside the non-rotating component and away from the engine flowpath.

DETAILED DESCRIPTION

In general, the present invention relates to a gas turbine engine that utilizes a vapor cooling assembly to cool non-rotating structures that extend into a gas flowpath (typically a combustion or turbine flowpath). The vapor cooling assembly includes a vaporization section located at least partially within a static structure that is exposed to a gas flowpath from which it is desired to remove thermal energy, and a condenser section located adjacent to or spaced from the gas flowpath where it is desired to expel thermal energy. The vapor cooling assembly is configured to transport thermal energy from the vaporization section to the condenser section at a relatively high rate through cyclical evaporation and condensation of a working medium sealed within the vapor cooling assembly. The condenser section can expel thermal energy to a fan bypass stream located adjacent to the combustion gas flowpath, in order to permit thrust recovery of that thermal energy in the fan bypass stream. A flow guide structure can be used to direct fan bypass air toward and past the condenser section.

As used herein, the term "static" as applied to gas turbine engine parts generally refers to non-rotating parts, although such parts may be subject to some movement, for instance, when installed in an engine of a movable vehicle.

Figure 1:
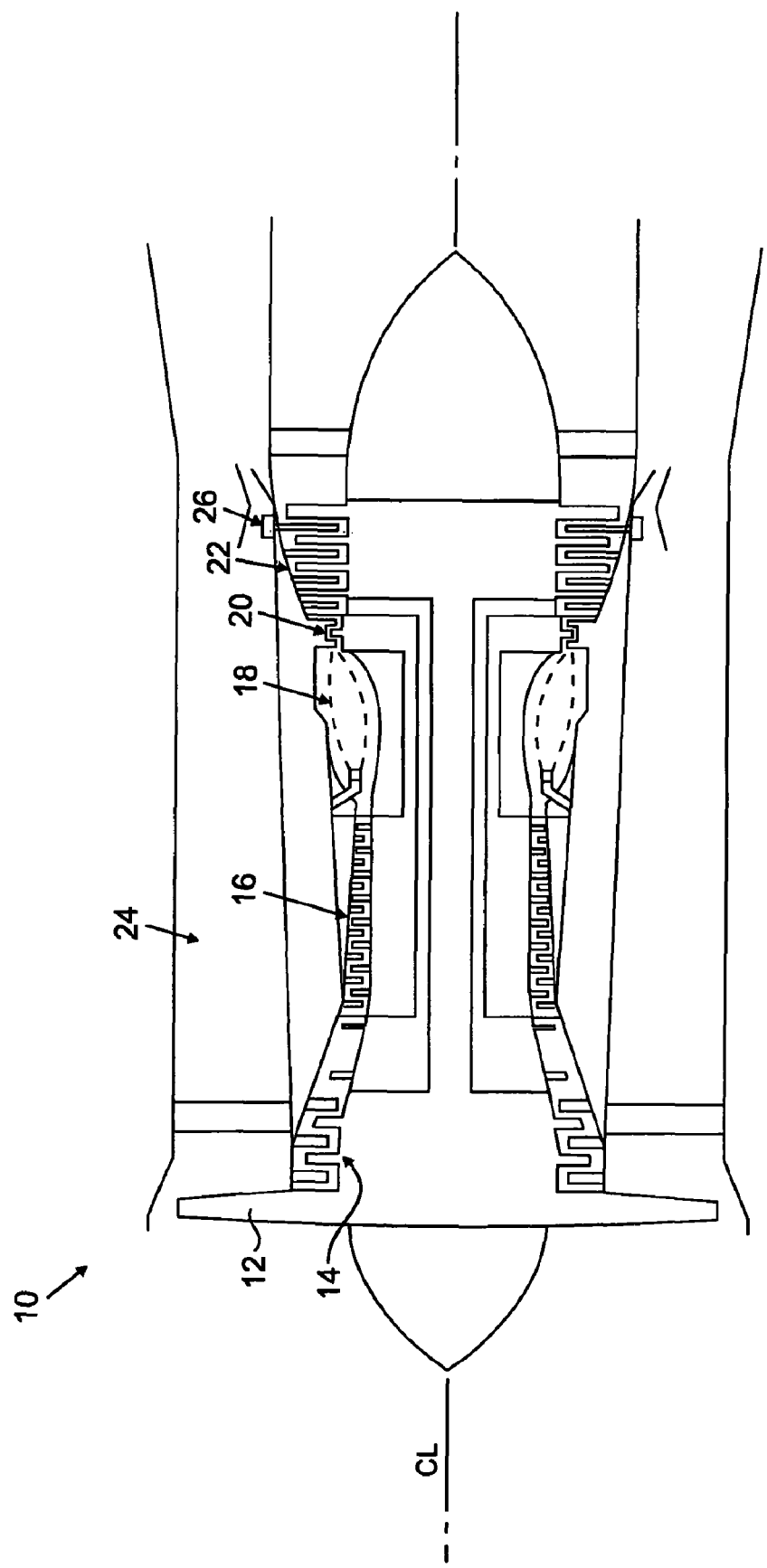
FIG. 1 is a schematic view of a gas turbine engine having a vapor cooling assembly according to the present invention.

FIG. 1 is a schematic view of a dual-spool gas turbine engine 10 that includes a fan section 12, a low-pressure compressor section 14, a high-pressure compressor section 16, a combustor section 18, a high-pressure turbine section 20, a low-pressure turbine section 22, and a fan bypass duct 24. A centerline CL is defined by the engine 10. The illustrated embodiment of the gas turbine engine 10 is provided merely by way of example, and it should be recognized that the present invention applies to gas turbine engines of any configuration. Those of ordinary skill in the art will understand the basic operation of gas turbine engines, and therefore further discussion here is unnecessary.

Figure 2:
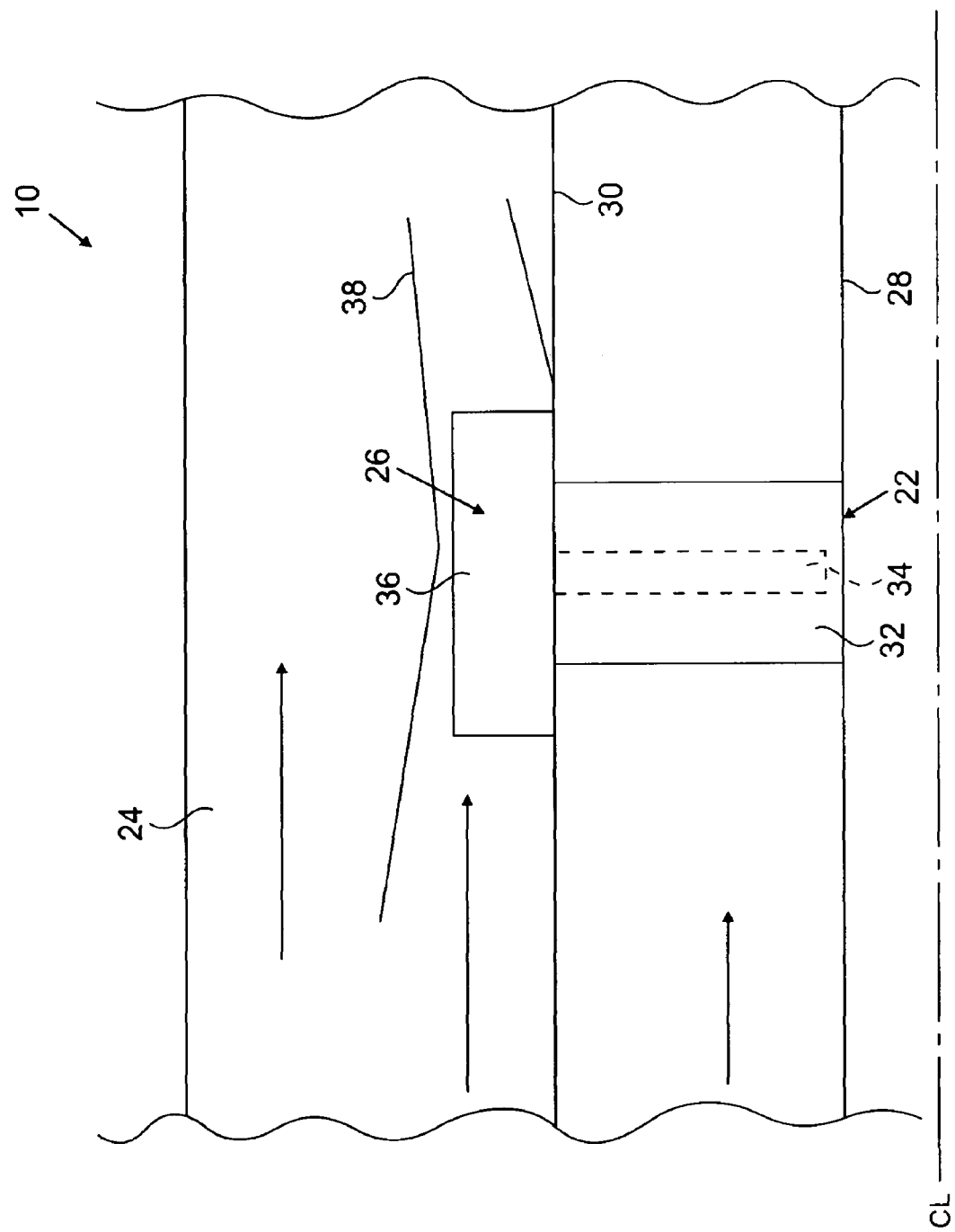
FIG. 2 is a schematic view of a portion of the gas turbine engine of FIG. 1.

The engine 10 further includes a vapor cooling assembly 26 located at the low-pressure turbine section 22. FIG. 2 is an enlarged schematic view of a portion of the gas turbine engine 10, showing the vapor cooling assembly 26 in greater detail. As shown in FIG. 2, a gas flowpath (e.g., combustion of turbine flowpath) is defined between a first boundary wall 28 and a second boundary wall 30. A fan bypass flowpath is defined by the fan bypass duct 24. Gas in the fan bypass flowpath is generally at a lower temperature and pressure than gas in the combustion gas flowpath. The illustrated embodiment of the engine 10 shows the second boundary wall 30 forming a boundary of both the combustion gas flowpath and the fan bypass duct 24. However, the combustion gas flowpath and the bypass duct 24 can be spaced apart in alternative embodiments.

An airfoil-shaped vane 32 of a stator assembly at the low-pressure turbine section 22 extends into the combustion flowpath. The vane 32 is a static component of the gas turbine engine 10. In an alternative embodiment, the structure designated by reference number 32 in FIG. 2 could represent a strut.

The vapor cooling assembly 26 includes a vaporization section 34 that extends into the vane 32 and a condenser section 36 that is located away from the combustion gas flowpath. The condenser section 36 extends either fully or at least partially into the fan bypass duct 24 (or other suitable area, e.g., one in which the vapor can be cooled) and an optional flow guide 38 directs fan bypass air toward and along the condenser section 36. Air passing along the condenser section 36 absorbs thermal energy expelled from the vapor cooling assembly 26. It should be recognized that the particular size and shape of the vaporization section 34, and its particular location within the vane 32 can vary as desired. Likewise, the particular configuration of the condenser section 36 can vary as desired.

The engine 10 includes a plurality of vanes arranged in an annular configuration about the centerline CL. In one embodiment, each vane of a particular stage is configured like vane 32, as shown in FIG. 2. That is, each vane 32 has a dedicated vapor cooling assembly 26, and a number of discrete condenser sections 36 extend into the fan bypass duct 24. In alternative embodiments, the vapor cooling assembly 26 provides cooling to a number of different structures of the engine 10. For example, nozzle segments that each include two or more airfoil shaped vanes could utilize a common, shared condenser section 36 with separate vaporization sections 34 that extend into each vane 32 of the nozzle.

The vapor cooling assembly 26 is sealed, and contains a working medium. The vapor cooling assembly 26 functions as a heat pipe that uses an evaporative cooling cycle to transfer thermal energy through the evaporation and condensation of a working medium. In particular, the vapor cooling assembly 26 utilizes an evaporative cooling cycle to transfer thermal energy from the vane 32 to air passing through the fan bypass duct 24. Thermal energy absorbed by the vane 32 from the hot gases in the combustion gas flowpath heats the vaporization section 34, which causes the working medium in the vaporization section 34 to evaporate. Moreover, the relatively cool air in the fan bypass flowpath absorbs thermal energy from the condenser section 36, and causes the (vaporized) working medium to condense. The working medium physically moves between the vaporization section 34 and the condenser section 36, in order to transfer the thermal energy between the locations where evaporation and condensation occur. Conventional capillary action structures (e.g., wicking structures) or a capillary action foam are included inside the vapor cooling assembly 26 in order to facilitate desired movement of the working medium along an established path between the condenser section 36 and the vaporization section 34 in a well-known manner without requiring the aid of gravity or other orientation-specific limits.

The composition of the working medium used in the vapor cooling assembly 26 is selected according to the particular operating conditions at which heat transfer is desired. Typically, working media conventionally used with evaporative cooling cycles are dependent upon operation within a particular range of temperature conditions (as well as pressure conditions). It is therefore necessary to select a suitable working medium based on the particular conditions under which each of the vapor cooling assembly is expected to operate, as will be understood by those skilled in the art. Temperatures in typical gas turbine engines can reach 1,649° C. (3,000° F.) or more, although actual engine temperatures will vary for different applications, and under different operating conditions. For instance, while the vapor cooling assembly 26 is operational, the engine 10 is configured such that the average gas flowpath temperature in will generally not exceed the maximum temperature limits for the materials (e.g., metals and ceramics) used in and along the combustion gas flowpath. A non-exclusive list of possible working media is provided in Table 1, although those skilled in the art will recognize that other working medium materials can be used.

TABLE 1

| Working Medium | Melting Point (° C.) | Boiling Point (° C. at 101.3 kPa) | Approximate Useful Range (° C.) |
| --- | --- | --- | --- |
| Helium | −271 | −261 | −271 to −269 |
| Nitrogen | −210 | −196 | −203 to −160 |
| Ammonia | −78 | −33 | −60 to 100 |
| Acetone | −95 | 57 | 0 to 120 |
| Methanol | −98 | 64 | 10 to 130 |
| Flutec PP2 ™ | −50 | 76 | 10 to 160 |
| Ethanol | −112 | 78 | 0 to 130 |
| Water | 0 | 100 | 30 to 200 |
| Toluene | −95 | 110 | 50 to 200 |
| Mercury | −39 | 361 | 250 to 650 |
| Sodium | 98 | 892 | 600 to 1200 |
| Lithium | 179 | 1340 | 1000 to 1800 |
| Silver | 960 | 2212 | 1800 to 2300 |

The optional flow guide 38 functions to direct air in the fan bypass flowpath toward and past the condenser section 36 of the vapor cooling assembly 26, and can then direct air heated by the condenser section 36 back to the fan bypass flowpath. The flow guide 38 can be configured similarly to flow guides used in conjunction with known heat exchangers. As shown in FIG. 2, the condenser section 36 is represented schematically as a box within the throat of the flow guide 38. However, it should be recognized that various embodiments of the present invention can incorporate a condenser section 36 configured with fins or other structures that span the throat of the flow guide 38, and have slots or passageways for air to flow between those fins or other structures.

The vapor cooling assembly 26 can provide cooling to static components of the engine 10, such as the vane 32, with essentially zero net energy loss, because the thermal energy transferred away from the combustion gas flowpath by the vapor cooling assembly 26 is as air in the fan bypass flowpath gains thermal energy. Thermal energy added to air in the fan bypass flowpath raises the temperature and pressure of that air, which contributes to thrust output of the engine 10. The flow guide 38 promotes efficient flow of air along the condenser section 36, and helps prevent aerodynamic efficiency losses in the fan bypass duct 24.

The use of the vapor cooling assembly 26 of the present invention does not require the use of bleed air to achieve cooling of static engine components. The use of bleed air in prior art cooling system produces significant engine efficiency losses (e.g., in terms of thrust output or fuel burn efficiency). In that respect, the present invention provides a more efficient cooling system.

Although the present invention has been described with reference to preferred embodiments, workers skilled in the art will recognize that changes may be made in form and detail without departing from the spirit and scope of the invention. For instance, the system of the present invention can be used to cool nearly any static component in nearly any location of a gas turbine engine.

What is claimed is:

1. A system for an engine, the system comprising:
    a non-rotating component extending into an engine flowpath, wherein the engine flowpath is a gas turbine combustion flowpath;
    a vapor cooling assembly configured to transport thermal energy from a vaporization section to a condenser section through cyclical evaporation and condensation of a working medium sealed within the vapor cooling assembly, wherein the vaporization section is located at least partially within the non-rotating component to accept thermal energy from the non-rotating component, and wherein the condenser section is located outside the non-rotating component and away from the engine flowpath; and
    a fan bypass flowpath defined by boundary walls at a location spaced from the engine flowpath, wherein the condenser section of the vapor cooling assembly is at least partially exposed to the fan bypass flowpath such that thermal energy is dissipated from the condenser section to air in the fan bypass flowpath to raise a pressure of a fluid in the fan bypass flowpath and contribute to thrust production by the engine.

2. The system of claim 1, wherein the non-rotating component comprises a vane.

3. The system of claim 1, wherein the non-rotating component comprises a support strut.

4. A heat transfer system for use in a gas turbine engine, the system comprising:
    a turbine flowpath defined by at least one boundary wall;
    a non-rotating component that extends into the turbine flowpath;
    a vapor cooling assembly comprising:
        a vaporization section configured to accept thermal energy from the non-rotating component;
        a condenser section located outside the turbine flowpath; and
        a working medium sealed within the vapor cooling assembly, wherein cyclical evaporation and condensation of the working medium transports thermal energy from the vaporization section to the condenser section; and
    a fan bypass flowpath defined by at least one duct wall, wherein the condenser section of the vapor cooling assembly is at least partially exposed to the fan bypass flowpath such that thermal energy is dissipated from the condenser section to air in the fan bypass flowpath.

5. The system of claim 4, wherein the non-rotating component comprises a vane.

6. The system of claim 4, wherein the non-rotating component comprises a support strut.

7. The system of claim 4, wherein the vaporization section is located within the non-rotating component.

8. A heat transfer system for use in a gas turbine engine, the system comprising:
   a turbine flowpath defined by at least one boundary wall;
   a static component that extends into the turbine flowpath;
   a bypass flowpath defined by at least one bypass duct wall; and
   a vapor cooling assembly comprising:
      a vaporization section configured to accept thermal energy from the static component;
      a condenser section at least partially exposed to the bypass flowpath and configured to dissipate thermal energy to air in the bypass flowpath to provide thrust recovery; and
      a working medium sealed within the vapor cooling assembly, wherein cyclical evaporation and condensation of the working medium transports thermal energy from the vaporization section to the condenser section.

9. The system of claim 8, wherein the static component comprises a vane.

10. The system of claim 8, wherein the static component comprises a support strut.

11. The system of claim 10, wherein fluid at the turbine flowpath adjacent to the vaporization section of the vapor cooling assembly is at a higher pressure than fluid at the bypass flowpath adjacent to the condenser section of the vapor cooling assembly.

12. The system of claim 8, wherein the heat transfer system does not eject air into the bypass flowpath.

13. The system of claim 8, wherein the vaporization section is located within the static component.

14. The system of claim 8, wherein the bypass flowpath comprises a fan bypass flowpath.

15. The system of claim 1 and further comprising:
   a flow guide positioned within the fan bypass flowpath to direct fan bypass air toward the condenser section of the vapor cooling assembly.

16. The system of claim 15, wherein the flow guide is configured to direct fan bypass air along the condenser section of the vapor cooling assembly in a generally axial direction.

17. The system of claim 4 and further comprising:
   a flow guide positioned within the fan bypass flowpath to direct fan bypass air toward the condenser section of the vapor cooling assembly.

18. The system of claim 17, wherein the flow guide is configured to direct fan bypass air along the condenser section of the vapor cooling assembly in a generally axial direction.

19. The system of claim 8 and further comprising:
   a flow guide positioned within the bypass flowpath to direct bypass air toward the condenser section of the vapor cooling assembly.

20. The system of claim 19, wherein the flow guide is configured to direct bypass air along the condenser section of the vapor cooling assembly in a generally axial direction.

* * * * *